United States Patent
Flory et al.

(10) Patent No.: US 12,179,534 B2
(45) Date of Patent: *Dec. 31, 2024

(54) MOTOR VEHICLE WITH MULTI-MODE EXTREME TRAVEL SUSPENSION-SUSPENSION HYDRAULIC DESIGN

(71) Applicant: PRATT & MILLER ENGINEERING & FABRICATION, LLC, New Hudson, MI (US)

(72) Inventors: Kenneth J. Flory, West Bloomfield, MI (US); Jesper Slattengren, Ann Arbor, MI (US); Guido Francesco Ritelli, Farmington Hills, MI (US)

(73) Assignee: Pratt & Miller Engineering & Fabrication, LLC, New Hudson, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,911

(22) Filed: Mar. 29, 2023

(65) Prior Publication Data
US 2024/0109383 A1    Apr. 4, 2024

Related U.S. Application Data

(63) Continuation of application No. 17/048,874, filed as application No. PCT/US2019/028220 on Apr. 19, 2019, now Pat. No. 11,633,999.
(Continued)

(51) Int. Cl.
*B60G 11/26* (2006.01)
*B60G 17/056* (2006.01)

(52) U.S. Cl.
CPC .......... *B60G 11/265* (2013.01); *B60G 17/056* (2013.01); *B60G 2202/154* (2013.01);
(Continued)

(58) Field of Classification Search
CPC ................ B60G 11/265; B60G 17/056; B60G 2202/154; B60G 2202/413;
(Continued)

(56) References Cited

U.S. PATENT DOCUMENTS 4,397,473 A * 8/1983 Miles ........................ B60G 5/04
280/124.16
4,696,489 A * 9/1987 Fujishiro .............. B60G 17/018
280/5.515
(Continued)

FOREIGN PATENT DOCUMENTS

EP    1 388 442 B1    2/2004
JP    62-286817 A    12/1987

OTHER PUBLICATIONS

Abd-El-Tavvwab, AM. Twin Accumulator Semi Active Suspension System with Preview Control. Journal of Low Frequency Noise, Vibration And Active Control. Sep. 6, 2007, vol. 26, No. 4, pp. 283-293.

*Primary Examiner* — Frank B Vanaman
(74) *Attorney, Agent, or Firm* — Foley & Lardner LLP

(57) ABSTRACT

A hydraulic suspension system for a motor vehicle having at least a pair of road engaging wheels. The suspension system includes, a hydraulic cylinder coupled with the each of the pair of road engaging wheels, the hydraulic cylinder defining a cap end volume and a rod end volume separated by a piston. A hydraulic supply circuit for the hydraulic cylinder includes, a high pressure hydraulic source, a low pressure hydraulic drain, a pair of hydraulic sub circuits each coupled to one of the hydraulic cylinder cap and rod end volumes. Each hydraulic sub circuit includes, a proportional supply flow valve coupled with the high pressure hydraulic source and one of the cylinder volumes, a return flow control proportional valve coupled with the low pressure hydraulic drain and the one cylinder volume, and an accumulator
(Continued)

coupled to the associated hydraulic cylinder volume through an accumulator fill control proportional valve.

20 Claims, 11 Drawing Sheets

Related U.S. Application Data

(60) Provisional application No. 62/660,524, filed on Apr. 20, 2018.

(52) U.S. Cl.
CPC .. *B60G 2202/413* (2013.01); *B60G 2202/414* (2013.01); *B60G 2202/416* (2013.01); *B60G 2300/07* (2013.01); *B60G 2500/114* (2013.01); *B60G 2600/182* (2013.01); *B60G 2800/912* (2013.01)

(58) Field of Classification Search
CPC ........ B60G 2202/414; B60G 2202/416; B60G 2300/07; B60G 2500/114; B60G 2600/182; B60G 2800/912
See application file for complete search history.

(56) References Cited

U.S. PATENT DOCUMENTS

| | | | | |
|---|---|---|---|---|
| 4,821,191 A * | 4/1989 | Ikemoto | ............... | B60G 17/016 701/38 |
| 4,874,052 A * | 10/1989 | Purcell | ............... | B62D 55/1125 180/9.1 |
| 5,630,623 A * | 5/1997 | Ganzel | ................. | B60G 17/016 280/124.157 |
| 5,682,698 A * | 11/1997 | Bevins | .................... | G09F 3/204 40/661 |
| 6,886,837 B2 * | 5/2005 | Gibbs | ....................... | F16F 9/48 180/209 |
| 7,240,906 B2 * | 7/2007 | Klees | .................... | B60G 21/10 280/5.502 |
| 7,318,595 B2 * | 1/2008 | Lamela | .............. | B60G 17/0152 280/124.16 |
| 7,779,974 B2 * | 8/2010 | Timoney | ............ | B60G 17/0162 188/312 |
| 8,191,903 B2 * | 6/2012 | Beuermann | .......... | B60G 17/052 701/37 |
| 8,672,335 B2 * | 3/2014 | Khajepour | ........... | B60G 21/073 280/5.514 |
| 9,174,509 B2 * | 11/2015 | Boge | ................. | B60G 17/0565 |
| 9,844,992 B2 * | 12/2017 | Aldrich | .................... | B62D 7/20 |
| 2003/0015846 A1 * | 1/2003 | Rogala | ................. | B60G 17/056 280/5.514 |
| 2004/0113377 A1 * | 6/2004 | Klees | .................... | B60G 21/073 280/5.514 |
| 2005/0258607 A1 * | 11/2005 | Brandenburger | ...... | B60G 17/04 280/5.519 |
| 2009/0261541 A1 * | 10/2009 | Huth | ................. | B60G 17/0152 280/5.507 |
| 2010/0044976 A1 * | 2/2010 | Rades | ................. | B60G 21/106 280/5.507 |
| 2013/0068550 A1 * | 3/2013 | Gale | ....................... | B62D 9/02 280/5.509 |
| 2015/0001825 A1 * | 1/2015 | Kazimiers | ........... | B60G 21/073 280/124.112 |

* cited by examiner

MOTOR VEHICLE WITH MULTI-MODE EXTREME TRAVEL SUSPENSION-SUSPENSION HYDRAULIC DESIGN

CROSS-REFERENCE TO RELATED PATENT APPLICATIONS

This application is a continuation of U.S. application Ser. No. 17/048,874, filed Oct. 19, 2020, which is a 35 U.S.C. § 371 national phase of PCT International Application No. PCT/US2019/028220, filed Apr. 19, 2019, which claims the benefit of and priority under 35 U.S.C. § 119 to U.S. Provisional Application No. 62/660,524, filed Apr. 20, 2018, the contents of which are incorporated herein by reference in their entirety.

STATEMENT OF GOVERNMENT SUPPORT

This invention was made with government support under Contract Number D16PC00029, awarded by DARPA. The United States Government has certain rights in the invention.

FIELD OF THE INVENTION

This invention relates to motor vehicles especially adapted for off-road and military applications having a multi-mode extreme travel suspension, along with other innovative features.

BACKGROUND

There are applications for off-road vehicles requiring high degrees of mobility, speed, agility, and obstacle avoidance, and further having extreme terrain maneuvering capabilities. A vehicle having such capabilities may be well suited for certain military, commercial and recreational applications. The present invention relates to such a vehicle having the above mentioned capabilities. More specifically, the present invention is related to a suspension arrangement for an extreme travel vehicle having features which may find applicability in a broad range of vehicle and potentially non-vehicle applications.

The requirements of the vehicle which is subject of the present invention is the control of the ground engaging wheel motion in various manners. For purposes of illustration, the vehicle will be described as having pairs of front and rear wheels. First, the static or "ride height" position of the wheels relative to the vehicle frame need to be established and controllable so that extreme maneuverability and mobility over difficult terrain is enabled. Second, the spring rate characteristics of the suspension's reaction to road induced vibrations and terrain features is preferably adjustable. For example, a high spring rate stiff suspension behavior may be desired in some modes of operation and others may favor a softer suspension reaction for enhanced operator comfort. In this description, spring rate is used as a general description of the suspension system's control of force exerted by the ground engaging wheels in various conditions and displaced positions. Third, it is desirable to enable controllable damping characteristics for the suspension system so that damping can be adjusted, both in the compression and rebound directions of suspension system motion.

SUMMARY

In accordance with the present invention, a motor vehicle with multi-mode extreme travel suspension is provided offering the above described preferred characteristics. Embodiments of the present invention provide a suspension arrangement fulfilling the above referenced objectives of ride height or static position adjustment over a long range, controllable and variable spring rate (force control) characteristics, and variable damping. The spring rate (force control) and damping parameters can be adjusted independently between the compression and rebound directions of suspension motion. These capabilities are provided through an arrangement of hydraulically operated suspension components and a hydraulic circuit design as described herein.

DETAILED DESCRIPTION

Figure 1:
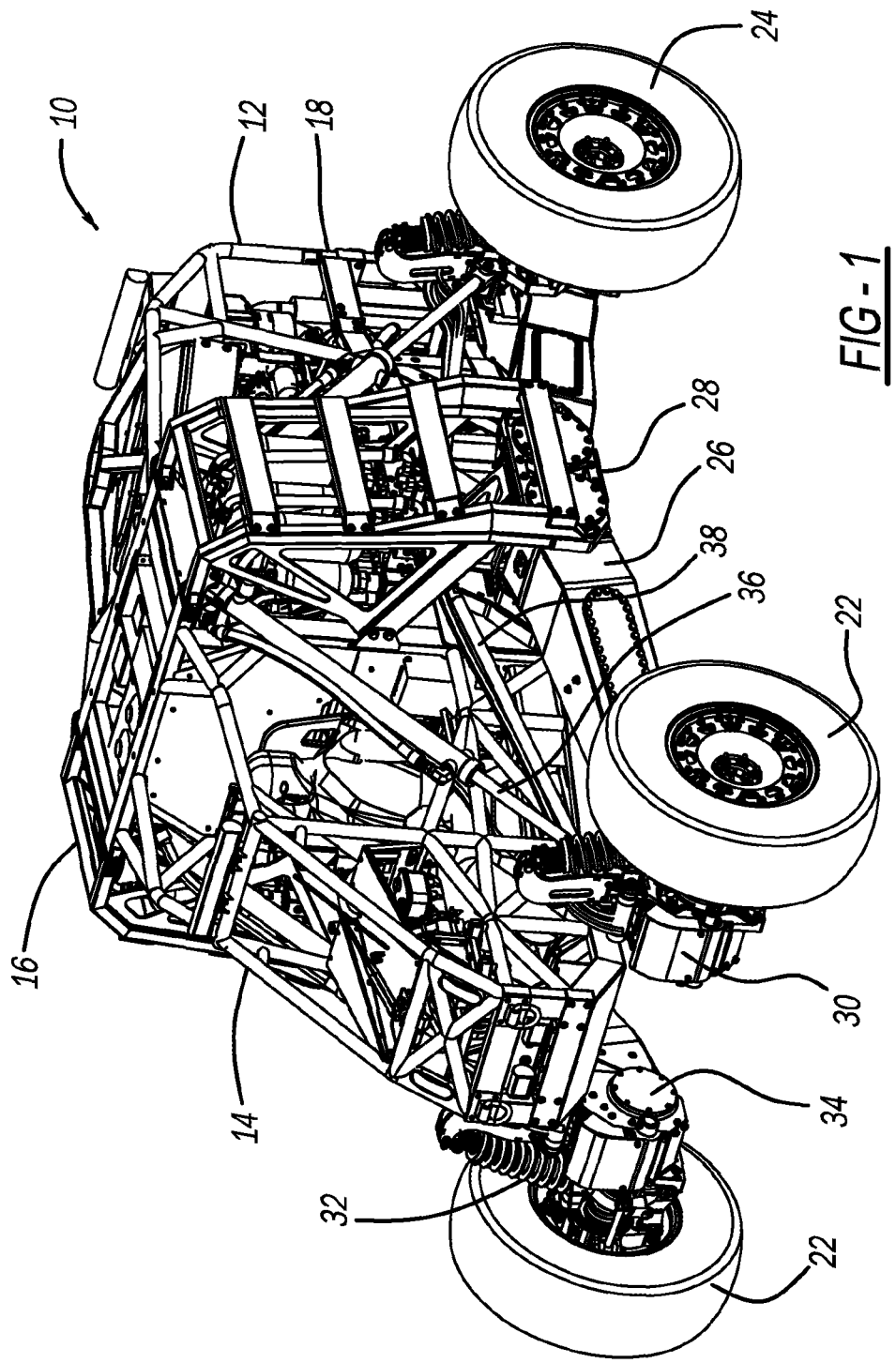
FIG. 1 provides a front isometric view of the basic vehicle in accordance with this invention, shown with exterior body panels removed.
Figure 2:
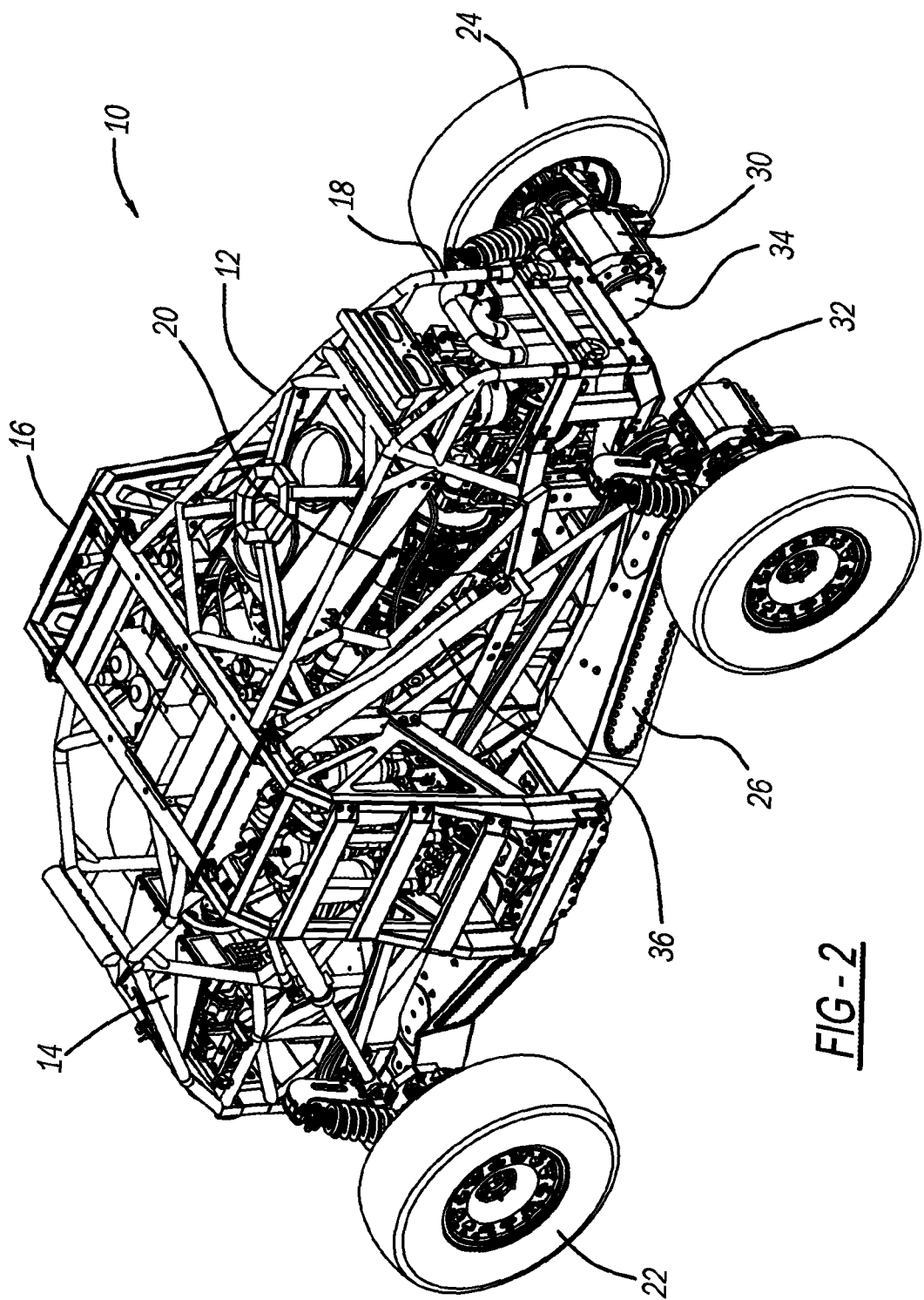
FIG. 2 provides a rear isometric view of the basic vehicle in accordance with this invention, shown with exterior body panels removed.
Figure 3A:
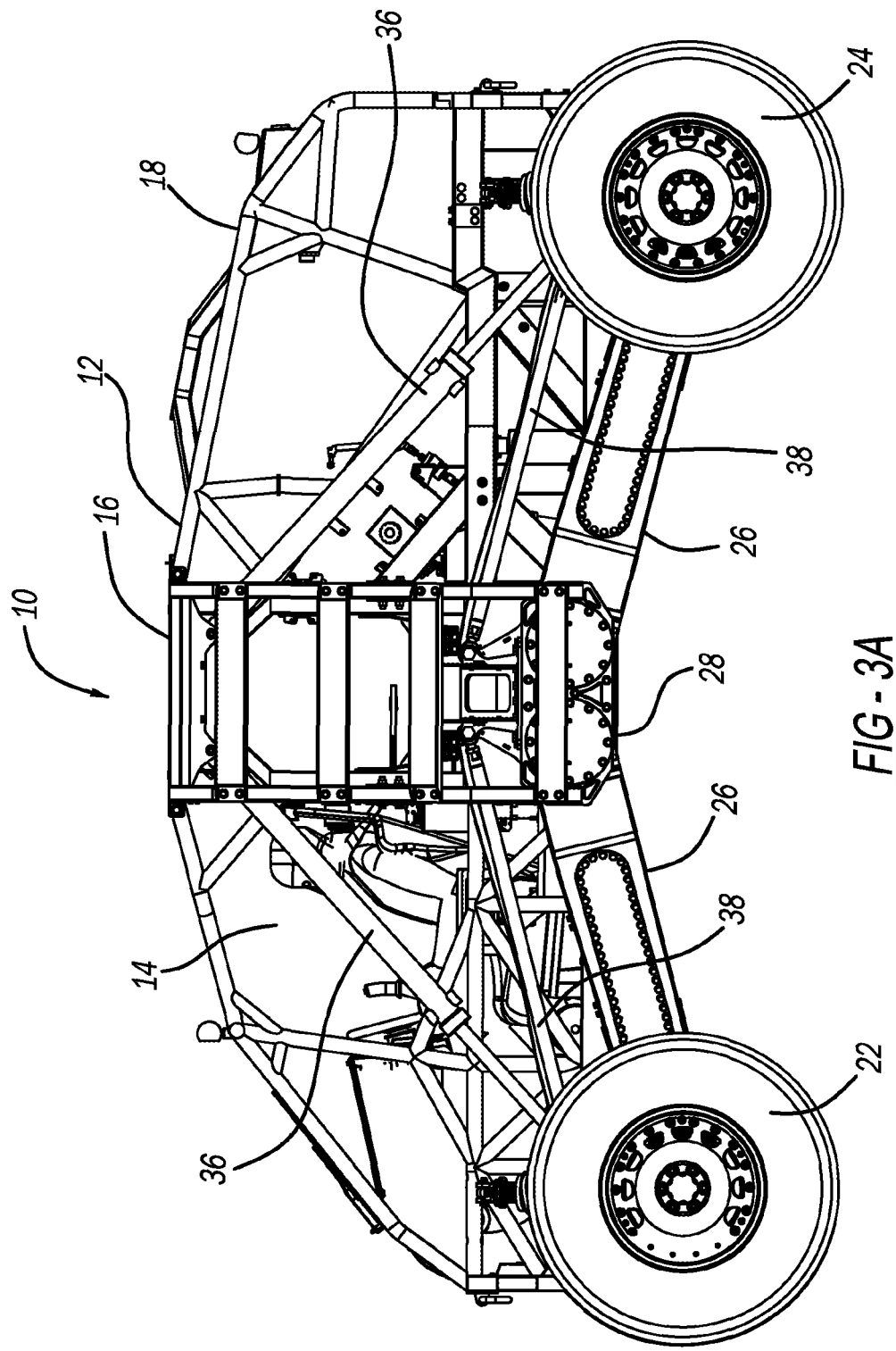
FIGS. 3A and 3B are respectively side and front views of the basic vehicle in accordance with this invention.
Figure 3B:
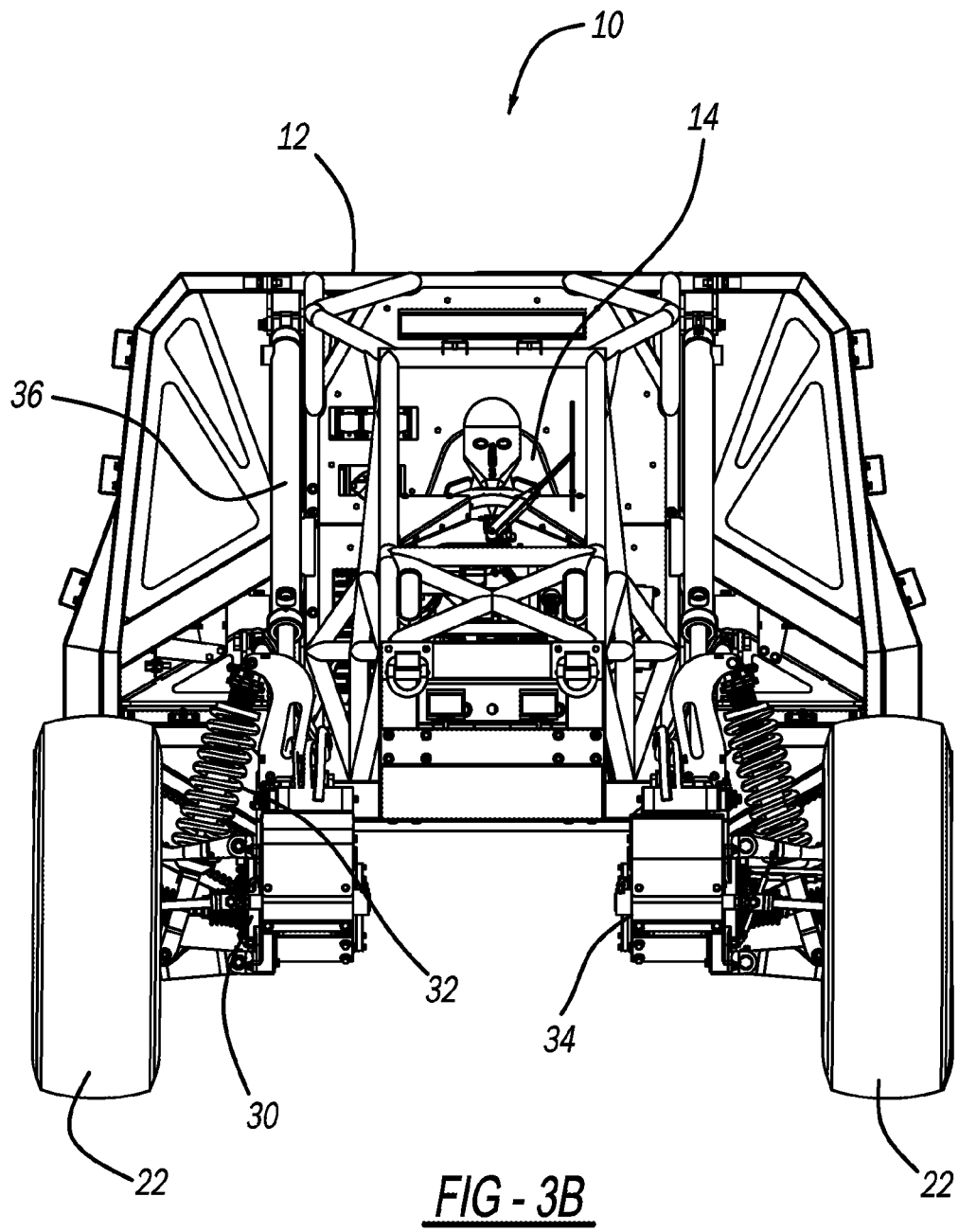
Figure 4:
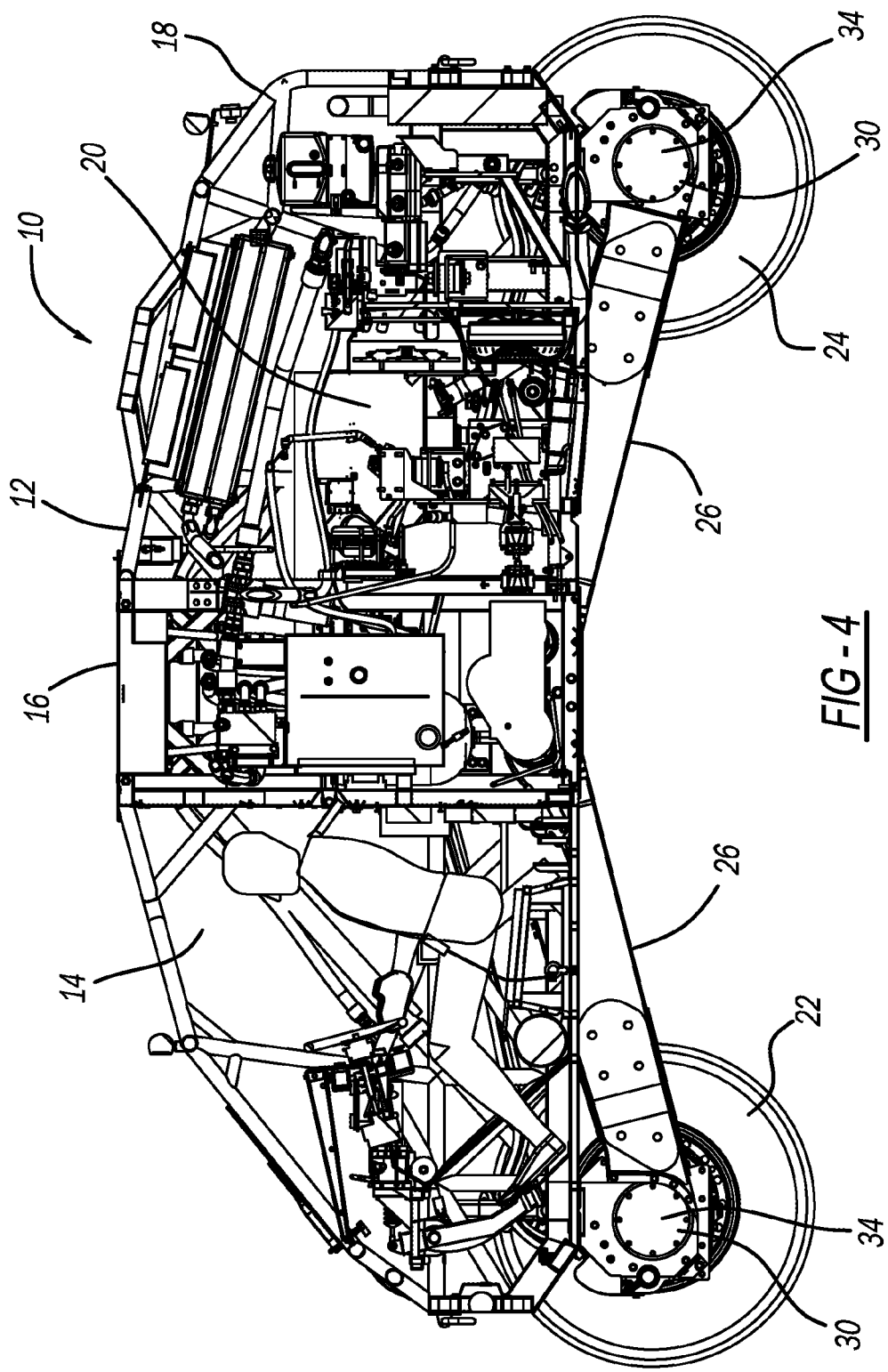
FIG. 4 shows the front vehicle layout in a longitudinal center cut pictorial section.

With reference to FIGS. 1-5, basic features of vehicle 10 are illustrated. Vehicle 10 is only one example of a vehicle type which may implement the suspension system and characteristics of the present invention. Exterior tube type frame structure 12 structurally supports the main components of vehicle 10. The driver compartment 14 is placed at the forward section of the vehicle. Main hydraulic and electrical control systems are positioned within center section 16, and rear compartment 18 houses engine 20. Front and rear pairs of a ground engaging wheels 22 and 24, respectively are provided.

Each of the four suspension corners of vehicle 10 have generally similar arrangements except that the dimensions between the front and rear wheel sets 22 and 24 differ. Again referring to FIGS. 1-5, a front left-hand corner unit will be described. Long suspension arm 26 pivots about bearing 28 located at the lower portion of vehicle center section 16. A wheel end unit 30 is mounted to the tip end of long suspension arm 26. Wheel end unit 30 includes a linear suspension elements in the form of strut 32 which is shown as a coil over shock type arrangement. In one embodiment of the present invention, strut 32 is a passive suspension element having internal spring rate and damping characteristics which may be tailored in the compression and rebound motion direction. Strut 32 could also be provided as an active or semi-active type having variable damping characteristics. Drive hub 34 is provided at each of the wheel corners for transmitting power through a propeller shaft (not shown) housed within the hollow interior cavity of long suspension arm 26 and geared to wheel drive hubs 34.

Hydraulic cylinder 36 provides a long a stroke capability for enabling an extreme range of travel for each of the wheel end units 30. Hydraulic cylinder 36 is controlled by a hydraulic circuit which is described in more detail below and which provides the desirable suspension characteristics of the present invention. As an example embodiment of the present invention, the high travel suspension provided for vehicle 10 is capable of jounce (upward) displacement on the order of 42 inches with 30 inches of rebound (downward) movement, from a representative nominal (static) condition. The suspension strut 32 can provide additional displacement for example in the range of ±4 inches of travel. Steering link arms 38 are provided for controlling steering articulation of each of the four wheels of the vehicle.

Figure 5:
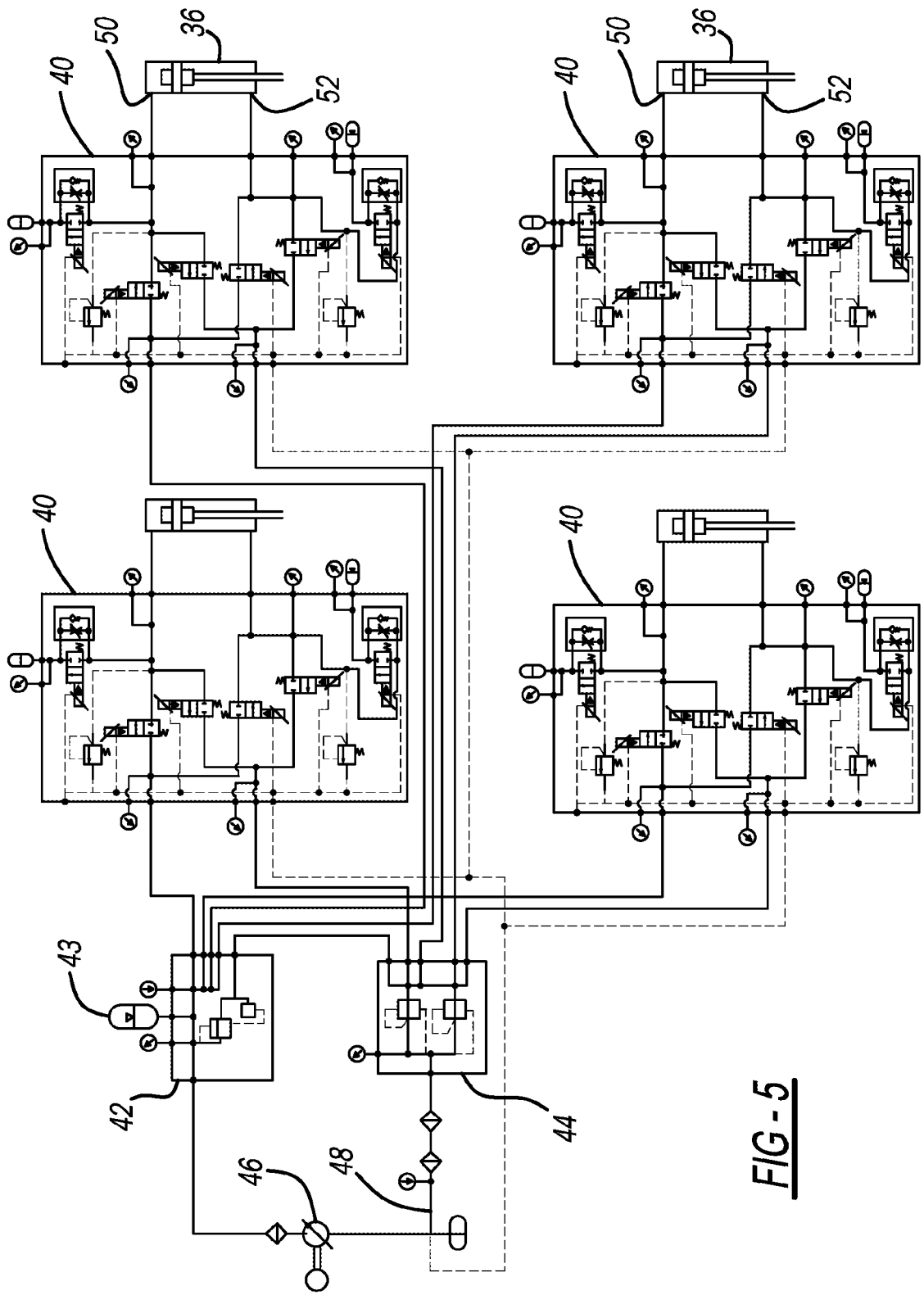
FIG. 5 provides an overall system hydraulic layout of the system.

FIG. 5 provides an overall hydraulic schematic diagram showing the identical wheel end unit hydraulic systems 40 provided for each wheel end. Each of these wheel end units 40 is connected with supply and return hydraulic systems 42 and 44, which are in turn coupled with motor driven hydraulic pump 46 and hydraulic reservoir 48. Supply system 42 includes accumulator 43. Systems 42 and 44 include appropriate flow control valves for providing hydraulic fluid at a desired pressure and flow rate capability. Hydraulic pump 46 can be driven directly by an internal combustion engine of vehicle 10 or by an electric motor.

Figure 6:
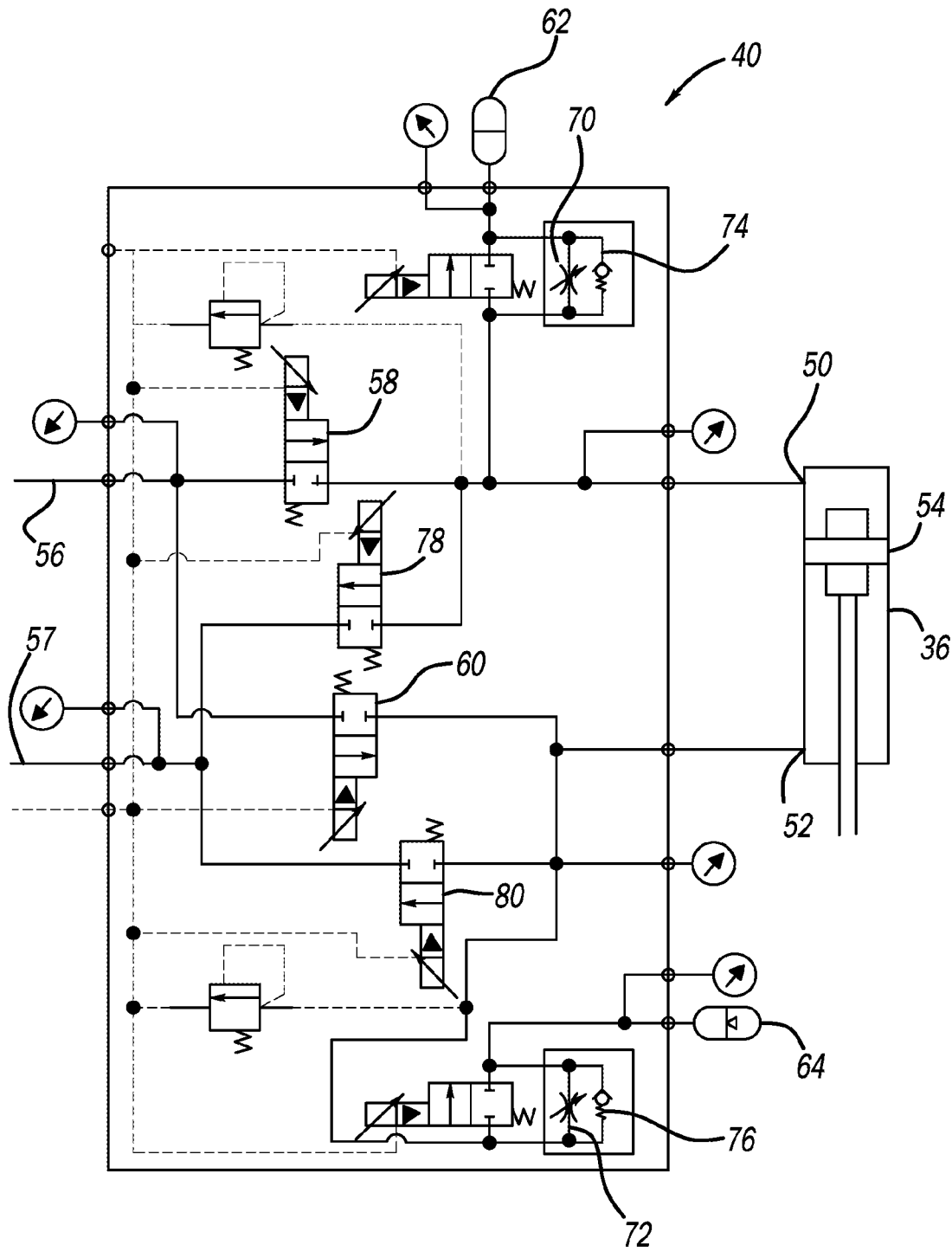
FIG. 6 illustrates in more detail the hydraulic circuit for a wheel corner unit.
Figure 7:
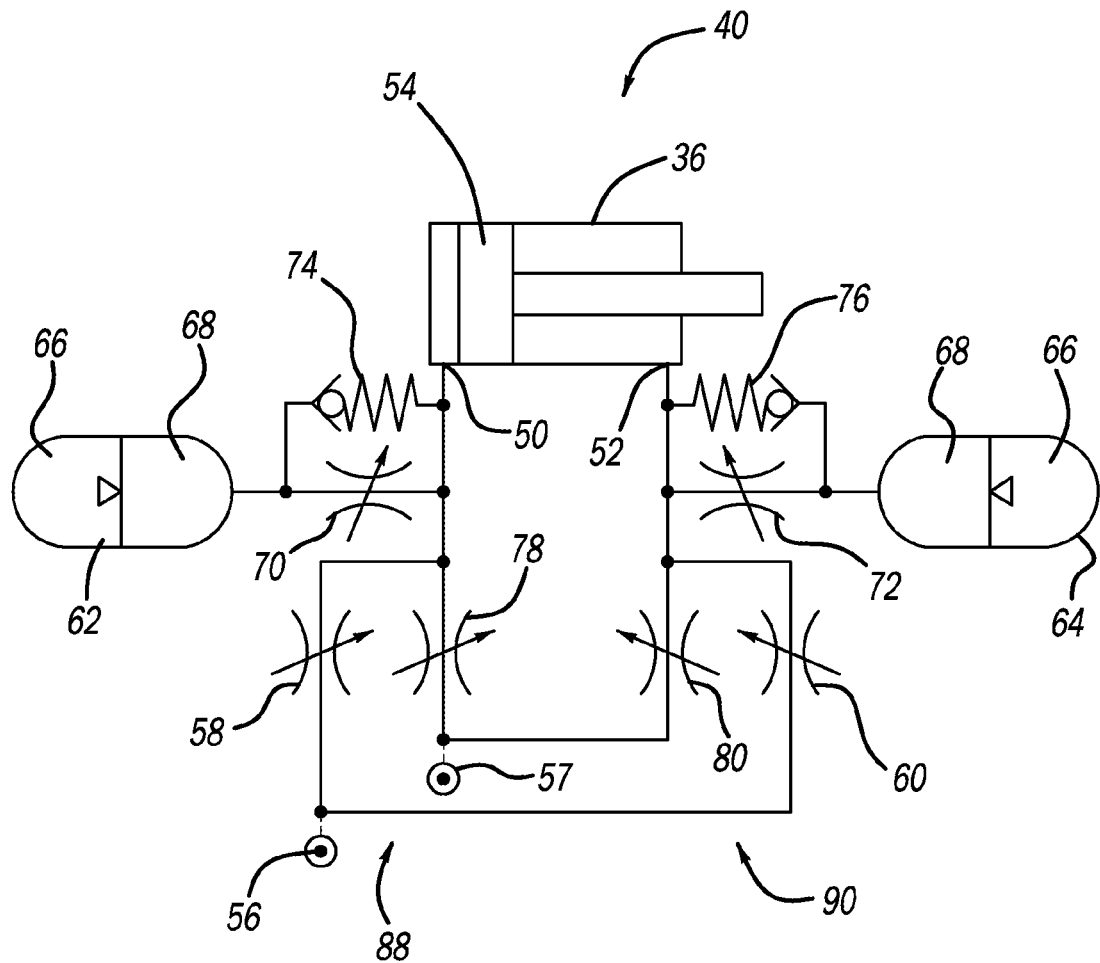
FIG. 7 is a simplified schematic representation of a wheel corner unit as shown in FIG. 6.

FIG. 6 is an enlarged view of one of the corner hydraulic units 40 along with illustrations of some of the principal components. FIG. 6 illustrates the components of the hydraulic system with component designations. FIG. 7 designates the same components in functional schematic manner and that figure will be used to describe, in more detail, operation of the hydraulic wheel end system 40.

Again referring to FIG. 7, the wheel end system 40 is shown coupled with hydraulic cylinder 36 with top or cap end port 50, associated with an extension direction of travel, and a rod end port 52 associated with a retraction movement of the hydraulic cylinder. Wheel end system 40 operates hydraulic cylinder 36 as a differential hydraulic cylinder, meaning that movement of the cylinder's piston 54 is controlled by simultaneously filling or draining fluid through a port on one side of piston 54 with the other side being reciprocally drained or filled through the associated port.

As evident from FIG. 7 there is symmetry in each of the wheel end supply systems 40 associated with each of the end ports 50 and 52 of cylinder 36. Both symmetrical sub circuits 88 and 90 are supplied by high pressure source 56 from supply system 42 which can controllably be connected to the cylinder ports through supply flow control proportional spool valves 58 and 60. Thus these valves can be operated to force hydraulic fluid into one side or the other of cylinder end ports 50 and 52. The pressure of hydraulic fluid applied to cylinder ports 50 and 52 through valves 58 and 60 is controlled using gas over hydraulic fluid accumulators 62 and 64. These are accumulators of well-known construction using a gas cavity 66 which may be compressed in a desired manner to provide pressure for the hydraulic fluid acting in the supply circuit to the rod end ports. The flow of hydraulic fluid which tends to fill and drain from the fluid side 68 of the accumulators is controlled by accumulator fill control proportional spool valves 70 and 72. High flow check valves 74 and 76 are present to control cavitation of the hydraulic fluid in the event that hydraulic fluid is caused to flow from the fluid side 68 of accumulators 68 at an excessive rate which could cause cavitation of the fluid. The draining or return of hydraulic fluid to low pressure source (drain) 57 is regulated by return flow control proportional spool valves 78 and 80 which serve to control the return or draining behavior of the cylinder end volumes.

With reference to the above-described hydraulic circuit 82, operation of the wheel end system 40 will be described. As mentioned previously, there are three primary suspension parameters associated with the present suspension system, each of which can be independently controlled. The ride height or static position of front and rear wheels 22 and 24 is controlled by the filling and draining of the appropriate side of hydraulic cylinder 36 via ports 50 and 52. Accordingly, when a ride height or wheel position command is generated, wheel end system 40 is controlled in a manner that supply flow control proportional spool valves 58 or 60 to cause one side of the cylinder to have an increased volume of hydraulic fluid, while the opposite side of the cylinder is drained via return flow proportional spool valves 78 or 80. When one of the supply flow control valves 58 and 60 is opened, the return flow proportional spool valve 78 or 80 of the opposite side is closed in a reciprocal manner. Likewise, when one of the return flow proportional valves 78 or 80 is open, the opposite side proportional valve 58 or 60 is closed. It is noted that the position of the associated front or rear wheel 22 or 24 is also related to the control of force exerted between the wheel and the terrain surface. Hydraulic circuit throughout its operation seeks to control this force in various operational conditions which is accomplished by control of the position of hydraulic cylinder piston 54, the spring rate or force control characteristics as well as damping. This force control occurs continuously in reaction to feedback signals from the vehicle. The system seeks to regulate the average heave/roll/pitch of the vehicle sprung mass while reducing forces that are transmitted to the sprung mass.

Due to the compliance provided by the gas spaces 66 of accumulators 62, the total volume of hydraulic fluid on each side of hydraulic cylinder 36 and in the associated flow supply sub circuits 88 and 90 of wheel end system 40 can be varied within the volume characteristics of the accumulators used. If the retained volume of each of the supply and return sub circuits 88 and 90 is increased, there is a decreased remaining volume in the accumulator gas spaces 66 which compression causes a higher gas pressure exerted on the hydraulic fluid. After the static position of hydraulic cylinder piston 54 is established, road or terrain influences or other force changes at each of the wheel corner units 30 causes some degree of compression and rebound motion allowed due to the compliance provided by the gas spaces. Thus by controlling the volumes on both sides of cylinder 36, effective spring rate change can be realized. The resultant force acting on hydraulic cylinder rod is a function of the effective areas on opposite sides of piston 54 and the applied fluid pressures. Once a position command for piston 54 is received, pressure on one side of piston 54 can be adjusted to provide the desired net output force and therefore position of the associated piston and connected suspension components. So long as the desired net output force is provided, pressure on both sides of the piston can be proportionally increased or decreased as desired, thus providing the desired spring rate as described above. Also as discussed above, the term spring rate is used here in a broad manner as tailoring applied force over displacement of the suspension system in a desired manner. Wheel end systems 40 are used to control force applied between the road engaging wheels 22 and 24 against the ground surface in a desired manner.

Adjustment of the suspension damping action provided for each of the wheel end units 30 is provided by the flow resistance established by accumulator fill control proportional spool valves 70 and 72 as they regulate the flow of fluid into and out of the accumulators 62 and 64. It is noted that these can be independently adjusted and therefore damping for compression and rebound stroking can be provided. Hydraulic sub circuit 88 is connected with the cap end cylinder port 50 which is associated with compression motion of the associated wheel end 30, whereas sub circuit 90 is connected with rod end cylinder port 52 associated with rebound motion.

FIG. 6 uses a different schematic representation for the components described previously but are identified by like reference numbers in that figure. In FIG. 6 the various proportional spool valves 58, 60, 70, 72, 78 and 80 are shown with associated solenoids used to set internal spool positions for providing the proportional control. Control of the spool valves is provided by adjusting current flow through the associated solenoids which establishes the internal spool position and hence the flow properties of the valve. Additional basic hydraulic components are shown in FIG. 6.

Figure 8:
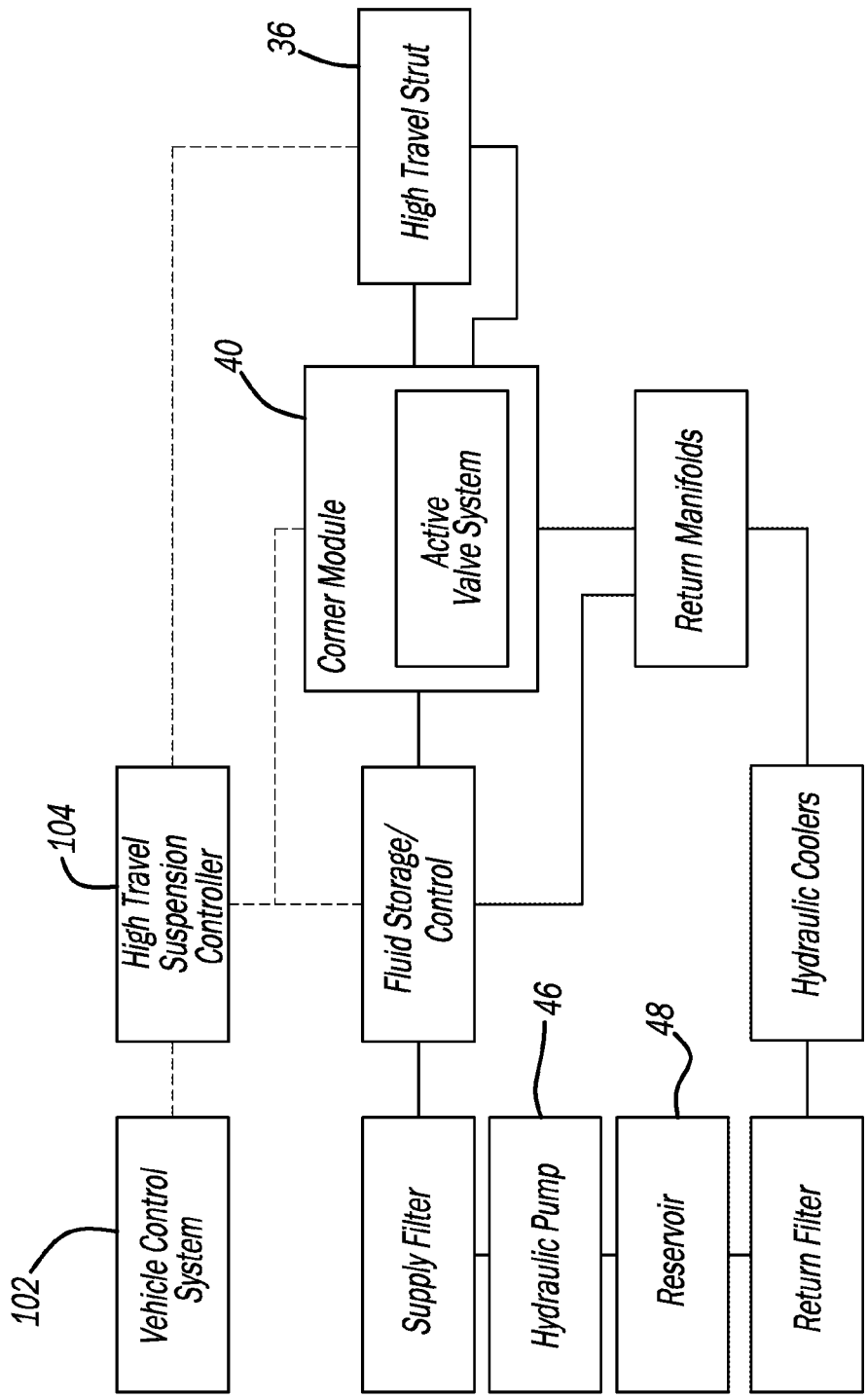
FIG. 8 is a flowchart showing primary components and subsystems of the suspension hydraulic system.

FIG. 8 provides a basic block diagram of the functional components of the suspension hydraulic system. The functional elements shown in FIG. 8 provide their listed functions and are used to control the movement and reactions to forces for high travel hydraulic cylinder 36. As shown by the figure, the system includes a vehicle control system 102 and high travel suspension controller 104. High travel suspension controller 104 receives control inputs from vehicle control system 102 and provides outputs which are used for providing operational control commands for hydraulic components of the wheel end systems 40. Included among the output signals generated by high travel suspension controller 104 is a set of control outputs which can be characterized as ride height commands, spring rate or force control commands, and damping control commands. It should be noted that these commands are not discrete in the operational sense since these outputs are used in various ways to actuate previously described hydraulic elements of each of wheel end systems 40. However, the groupings are useful in describing the operational commands that result from desires to change right height or wheel position, spring rate (force control), and damping. As described previously, a ride height or wheel position command relates to the relative volume of fluid on both sides of hydraulic cylinder piston 54 of cylinder 36 as the piston position directly relates to ride height or static height of the suspension system. This command is executed by opening and closing of supply flow control proportional valves 58 and 60, and the corresponding control of the return flow control proportional valve 78 and 80 associated with the other side of hydraulic cylinder 36. In this manner, the position or height for each of the wheel corner units 30 can be established. A spring rate or force command is executed by in addition to establishing wheel position, changing the volume of hydraulic fluid retained within the circuits 86 and 88 associated with each side of hydraulic cylinder piston 54. As explained previously, a higher retained volume in both circuits results in higher compression of the gas space of accumulators 62 and 64. A damping command can be realized by adjustments of accumulator fill control proportional valves 70 and 72 as mentioned previously. These parameters can be adjusted independently, in other words, a differing characteristic can be provided for compression and rebound motions. High travel suspension controller 104 can include drive circuits for directly controlling solenoids associated with each of the proportional valves mentioned previously, or such control can be implemented through intermediate high-power electric proportional controllers.

Figure 9A:
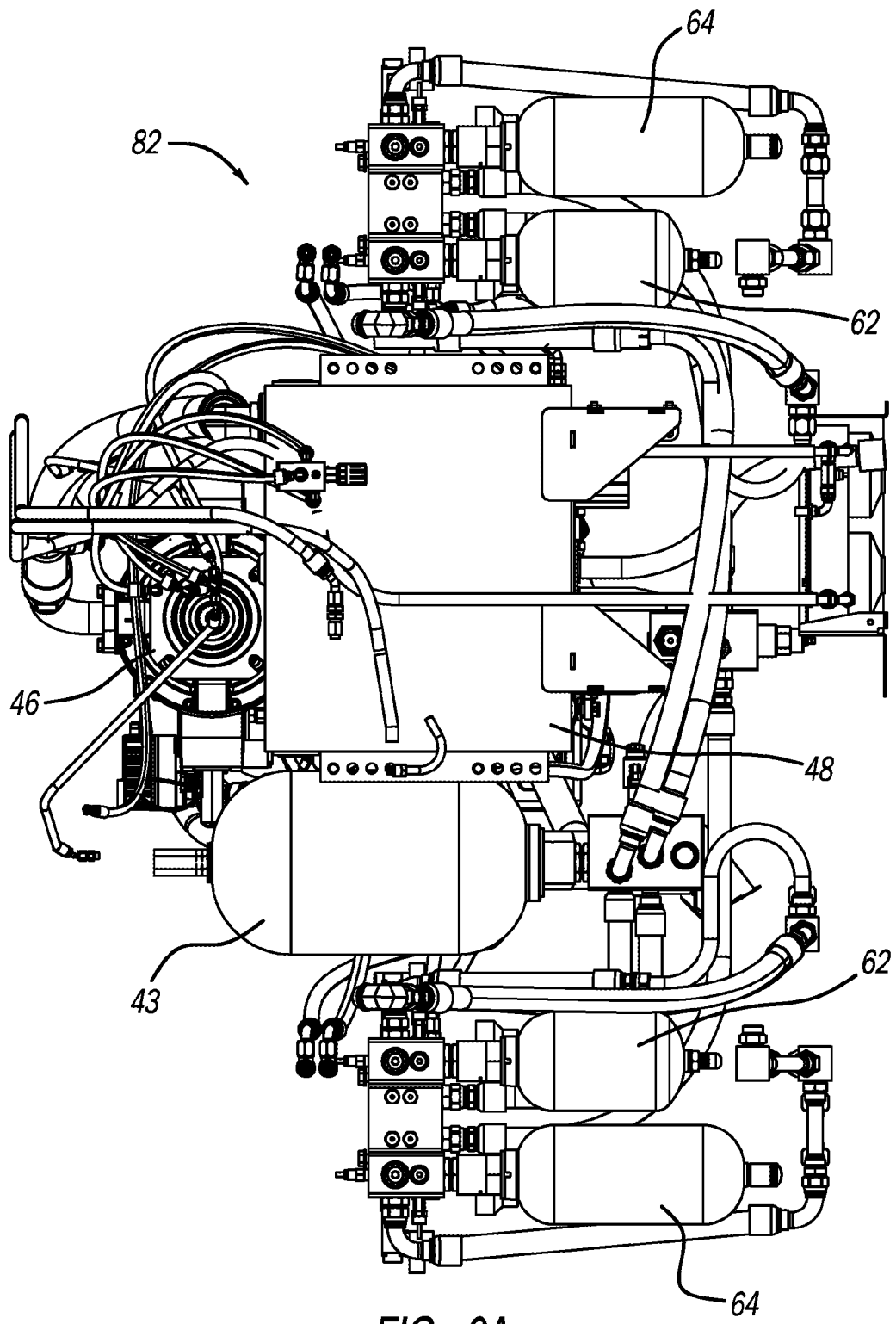
FIGS. 9A and 9B illustrate a full hydraulic system for the vehicle showing packaging for the hydraulic system.
Figure 9B:
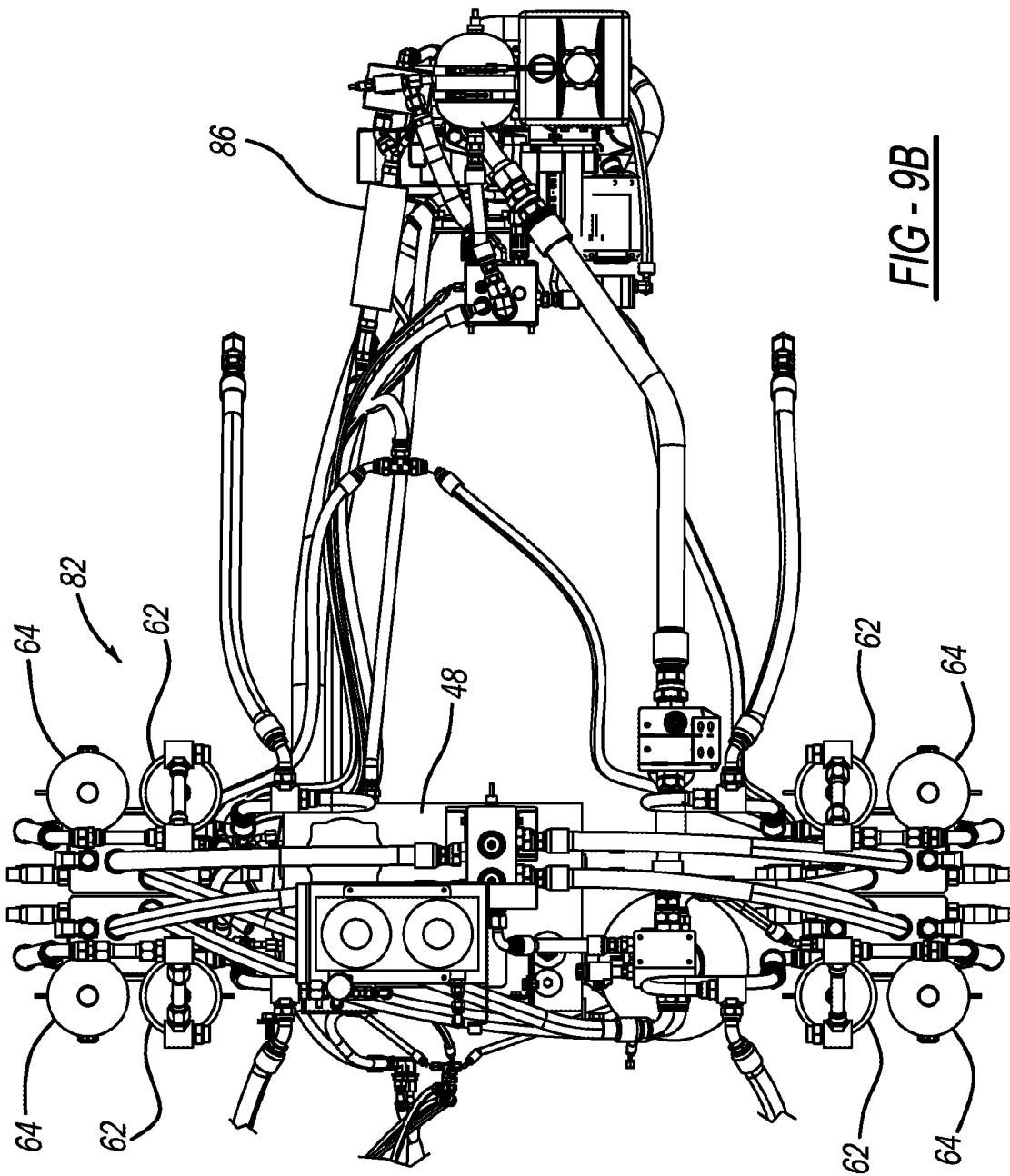

FIGS. 9A and 9B illustrate hardware components of the overall hydraulic system and shows one manner of packaging the hydraulic system 82. Conveniently the supply and return systems 42 and 44 for each of the wheel end systems are packaged together as a subassembly. Hydraulic pump 46 is shown connected with supply accumulator 43 and reservoir 48. Individual wheel end systems 40 are packaged together in the unit as shown, each having their own accumulators 62 and 66 and associated valving. FIG. 9B also shows secondary hydraulic system 86 which it may be used to power and control other vehicle systems.

While the above description constitutes the preferred embodiment of the present invention, it will be appreciated that the invention is susceptible to modification, variation and change without departing from the proper scope and fair meaning of the accompanying claims.

The invention claimed is:

1. A hydraulic suspension system for a motor vehicle having at least a pair of road engaging wheels, the suspension system, comprising:
   a pair of hydraulic cylinders, each of the hydraulic cylinders coupled with one of the road engaging wheels of the pair of road engaging wheels, each of the hydraulic cylinders defining a cap end volume and a rod end volume separated by a piston;
   a hydraulic supply circuit for the pair of hydraulic cylinders the hydraulic supply circuit including:
      a high pressure hydraulic source, and a low pressure hydraulic drain; and
   a pair of hydraulic subcircuits each of the pair of hydraulic subcircuits coupled to one of the cap end volume or the rod end volume of a corresponding one of the hydraulic cylinders, each hydraulic subcircuit including a proportional supply flow valve coupled with the high pressure hydraulic source and one of the cap end volume or the rod end volume, a return flow control proportional valve coupled with the low pressure hydraulic drain another of the cap end volume or the rod end volume, and an accumulator coupled to one of the cap end volume or the rod end volume through an accumulator fill control proportional valve;
   wherein the pair of hydraulic subcircuits are configured to exchange fluid with the hydraulic supply circuit without directly exchanging hydraulic fluid with each other.

2. The hydraulic suspension system in accordance with claim 1 further comprising, a high travel suspension arm pivotably connected to a frame structure of the motor vehicle and coupled to a wheel end unit, the suspension arm coupled with the hydraulic cylinder such of the hydraulic cylinder controls the position of the suspension arm and the wheel end unit relative to the frame structure.

3. The hydraulic suspension system in accordance with claim 2 further comprising, the vehicle having at least four of the high travel suspension arms and at least four of the hydraulic cylinders, each of the hydraulic cylinders having an independent one of the hydraulic supply circuits.

4. The hydraulic suspension system in accordance with claim 3 further comprising, wherein the four high travel suspension arms and hydraulic cylinder of each of the four high travel suspension arms are associated with pairs of front and rear road engaging wheels.

5. The hydraulic suspension system according to claim 4 further comprising, a high travel suspension controller providing control signals to the hydraulic supply circuits and configured to control force between the road engaging wheels and a ground surface.

6. The hydraulic suspension system in accordance with claim 2 further comprising, a linear low-travel suspension unit coupled to the high travel suspension arm end and to the road engaging wheel.

7. The hydraulic suspension system according to claim 6 further comprising, the linear low travel suspension unit provided in the form of a passive or semi-active damping strut and a spring member.

8. The hydraulic suspension system in accordance with claim 1 further comprising, a controller adapted for receiving control inputs and providing at least one functional control output including at least one of a ride height output, a force output, or a damping output.

9. The hydraulic suspension system in accordance with claim 8, wherein the at least one functional control output comprises the ride height output, the ride height output implemented to provide actuation signals to one of the supply flow control proportional valves associated with one of the hydraulic cylinder cap and rod volumes to increase the quantity of a hydraulic fluid within the sub-circuit while an opposing sub circuit return flow control proportional valve is modulated to cause a desired position change for the hydraulic cylinder piston.

10. The hydraulic suspension system in accordance with claim 8, wherein the at least one functional control output comprises the force output, wherein the force output is implemented to provide actuation signals to the supply flow control proportional valves and the return flow proportional valves to cause predetermined quantities of a hydraulic fluid retained by each of the hydraulic sub circuits thereby regulating compression of a gas space of the accumulators and the pressure of the hydraulic fluid in the hydraulic sub circuits.

11. The hydraulic suspension system in accordance with claim 8, wherein the at least one functional control output comprises the damping output, the damping output implemented to provide actuation signals to the accumulator fill control proportional valves to provide a controlled resistance of the flow of a hydraulic fluid through the accumulator fill control proportional valves.

12. The hydraulic suspension system in accordance with claim 1 further comprising, a controller adapted for receiving control inputs and providing at least three simultaneous functional control outputs including a ride height output, a force output, and a damping output.

13. The hydraulic suspension system according to claim 1 further comprising, the high pressure hydraulic source having a supply accumulator for regulating pressure of a hydraulic fluid at the high pressure hydraulic source.

14. A vehicle comprising:
at least a pair of tractive elements; and
a hydraulic suspension system comprising:
a pair of hydraulic cylinders, each of the hydraulic cylinders coupled with one of the pair of tractive elements, each of the pair of the hydraulic cylinders defining a cap end volume and a rod end volume separated by a piston;
a hydraulic supply circuit for the hydraulic cylinder including:
a high pressure hydraulic source;
a low pressure hydraulic drain; and
a pair of hydraulic sub-circuits each coupled to one of the cap end volume or the rod end volume of a corresponding one of the hydraulic cylinders, each hydraulic sub-circuit including a proportional supply flow valve coupled with the high pressure hydraulic source and one of the cap end volume or the rod end volume, a return flow control proportional valve coupled with the low pressure hydraulic drain and another of the cap end volume or the rod end volume, and an accumulator coupled to one of the cap end volume or the rod end volume through an accumulator fill control proportional valve, the pair of hydraulic sub-circuits configured to permit independent movement of the pair of hydraulic cylinders without directly exchanging hydraulic fluid.

15. The vehicle of claim 14, wherein the hydraulic suspension system further comprises:
a high travel suspension arm pivotably connected to a frame structure of the vehicle and coupled to a wheel end unit, the suspension arm coupled with the hydraulic cylinder such that the hydraulic cylinder controls the position of the suspension arm and the wheel end unit relative to the frame structure, the wheel end unit coupled with one of the tractive elements.

16. The vehicle of claim 15, wherein the hydraulic suspension system further comprises at least four of the high travel suspension arms and at least four of the hydraulic cylinder, each of the at least four hydraulic cylinders having an independent one of the hydraulic supply circuits.

17. The vehicle of claim 14, further comprising a controller adapted for receiving control inputs and providing at least one functional control outputs including a ride height output, a force output, and a damping output.

18. The vehicle of claim 14, further comprising, a controller adapted for receiving control inputs and providing at least three simultaneous functional control outputs including a ride height output, a force output, and a damping output.

19. The vehicle of claim 14, further comprising, the high pressure hydraulic source having a supply accumulator for regulating pressure of a hydraulic fluid at the high pressure hydraulic source.

20. A hydraulic suspension system for a motor vehicle having at least a pair of road engaging wheels, the suspension system comprising,
a pair of hydraulic cylinders, each of the hydraulic cylinders coupled with one of the road engaging wheels, each of the hydraulic cylinders defining a cap end volume and a rod end volume separated by a piston,
a hydraulic supply circuit for the hydraulic cylinder including,
a high pressure hydraulic source, a low pressure hydraulic drain, a pair of hydraulic sub-circuits each coupled to one of the hydraulic cylinder cap and rod end volumes of a corresponding one of the hydraulic cylinders, each hydraulic sub-circuit including, a proportional supply flow valve coupled with the high pressure hydraulic source and one of the cylinder end volumes, a return flow control proportional valve coupled with the low pressure hydraulic drain another of the cylinder volumes, and an accumulator coupled to one of the hydraulic cylinder volumes through an accumulator fill control proportional valve, wherein the pair of hydraulic cylinders are fluidly de-coupled from each other,
a high travel suspension arm pivotably connected to a frame structure of the motor vehicle and coupled to a wheel end unit, the suspension arm coupled with the hydraulic cylinder such that the hydraulic cylinder controls the position of the suspension arm and the wheel end unit relative to the frame structure, and a linear low-travel suspension unit coupled to the high travel suspension arm end and to the road engaging wheels.

* * * * *